INVENTOR
CLARENCE E. HUBBELL
ATT'Y.

United States Patent Office 3,540,172
Patented Nov. 17, 1970

3,540,172
INTEGRAL CIRCULAR HATCH FRAME
Clarence E. Hubbell, Homewood, Ill., assignor to Stanray Corporation, Chicago, Ill., a corporation of Delaware
Filed June 27, 1968, Ser. No. 740,579
Int. Cl. E04b 7/18; B61d 17/16
U.S. Cl. 52—19                                6 Claims

ABSTRACT OF THE DISCLOSURE

A circular hatch frame construction for freight vehicles wherein the hatch frame is integral with a roof sheet which may be a flat sheet or corrugated to impart rigidity thereto. The hatch frame is formed as a hollow cone having an upwardly curved sidewall integrally extending from the roof sheet. The conical sidewall terminates at the upper end thereof in a continuously annular outwardly curled lip defining a weather lip.

BACKGROUND—SUMMARY—DRAWINGS

The present invention relates to roof hatches for freight vehicles and the like, and more particularly to a circular hatch frame which is integral with a roof sheet.

Heretofore, circular hatch frames have been constructed with a sidewall made from a metal sheet which is formed into an open ended cylinder by welding the adjoining edges. The open ended cylindrical frame is then fitted over a previously formed opening in the roof sheet and secured thereto by welding.

The foregoing described hatch construction required approximately 10 feet of welding. There are usually two hatch frames on each roof sheet so that approximately 20 feet of welding were required per sheet. It is readily apparent, therefore, that this prior hatch frame construction is not only costly but is also time consuming to fabricate. Moreover, there also exists the probability of imperfect welds and the like so that the hatch frame is subject to leakage through the seam welds or under some circumstances to structural failure.

It is a primary object of the present invention to provide a new and improved hatch frame construction and roof sheet which overcomes the deficiencies of these prior structures.

In accordance with the present invention, this is accomplished by a circular hatch frame which is integral with the roof sheet so as to eliminate all welding seams. The integral circular hatch includes an annular outwardly curled lip defining a weather lip on which a hatch cover is adapted to seat.

For a more detailed description and understanding of the invention, reference is made to the following drawings forming a part of the description and wherein like reference characters indicate like parts.

Figure 1:
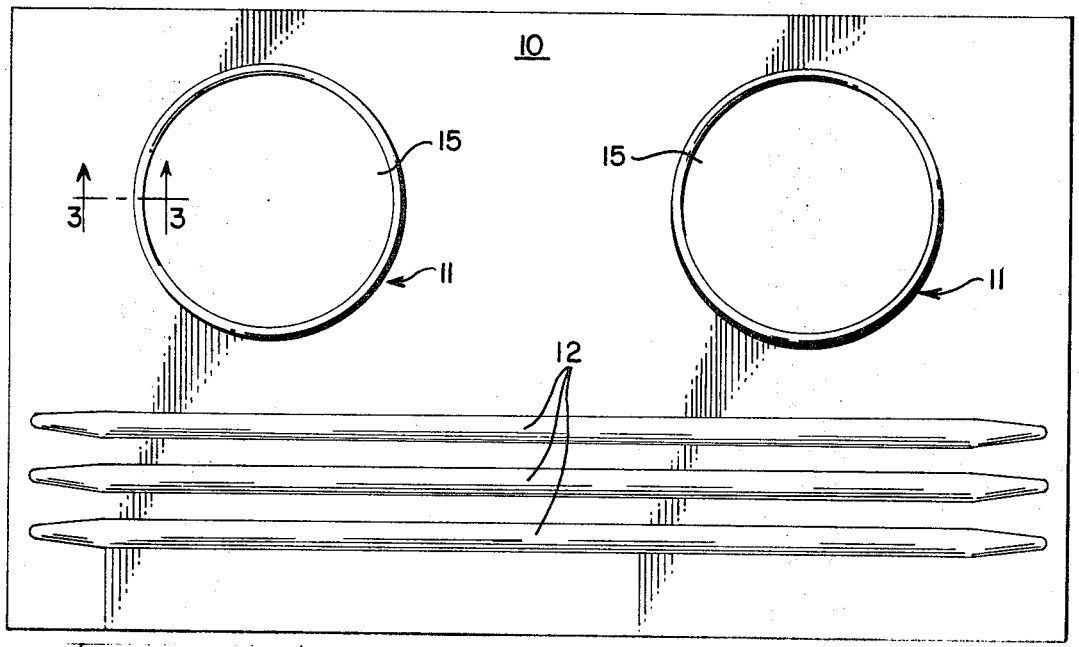
FIG. 1 is a top plan view of a pair of hatch frames embodying the principles of the present invention and incorporated in a corrugated roof sheet.

Referring now to FIG. 1, there is shown a roof sheet 10 having a pair of hatch frames 11 of the present invention incorporated therein. The roof sheet 10 is particularly adapted for application to a railway freight vehicle and when so applied extends transversely of the vehicle with the roof hatches 11 disposed on opposite sides of the longitudinal center line of the roof. Normally a railway freight vehicle uses a plurality of these roof sheets in side to side relationship extending across the roof, secured together at their meeting side edges and along their end edges to the side plates of the car.

Figure 2:
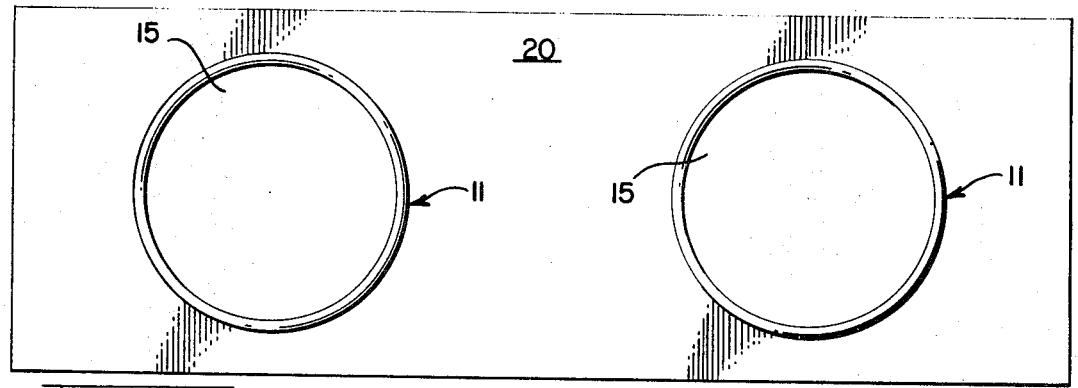
FIG. 2 is a view similar to FIG. 1 but showing the hatch frames incorporated in a flat roof sheet.

As shown in FIG. 1 the roof sheet 10 is formed with a plurality of side by side corrugations 12 which are arranged to impart rigidity to the freight vehicle roof structure and at the same time take up material which otherwise would cause wrinkling of the sheet. In FIG. 2 there is illustrated a substantially planar roof sheet 20 and, since this modification is not corrugated, transverse carlines, not shown, or other type of stiffeners, are used along the meeting edges of said sheets 20 to provide rigidity to the roof when applied on the vehicle.

The hatch frame members 11 are formed integral with the respective roof sheets 10 and 20 and are of substantially identical structure. The hatch frames 11 each includes a side wall 13 and a weather lip 14 extending continuously about the upper end of the side 13. The weather lip 14 is sized to accommodate a hatch cover, not shown, in the usual manner.

Figure 3:
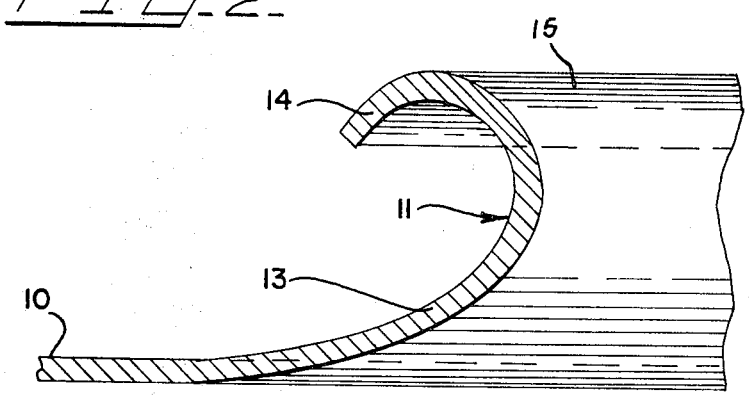
FIG. 3 is a cross sectional view taken generally along the line 3—3 of FIG. 1 and showing the configuration of the hatch frame.

As shown, the hatch frame 11 is of generally hollow conical configuration having an upwardly curved side wall 13 defining a hatch opening 15. The side wall 13 at the lower end thereof is integral with the roof sheet 10 and continuously curves upwardly therefrom on an irregular curve, terminating in the weather lip 14, all as shown in FIG. 3. The side wall 13 may be formed by sequentially hot or cold pressing the roof sheet to stretch and reform the material in the area in which the hatch frame is to be formed. A circular cut-out in the roof sheet to form the hatch opening 15 may be cut either prior to or during the pressing operation. In this connection it is to be noted that the sidewall 13 is somewhat thinner than the remainder of the roof sheet 10 as a result of the pressing and stretching. The diameter of the hatch opening 15 is generally determined during the pressing and formation of the downwardly turned water lip 14.

Although the embodiment constructed in accordance with the present invention has been described with the requisite particularity, the disclosure is of course exemplary. Changes in details of construction, in size, configuration and arrangement of components and materials and in modes of application will be apparent to those versed in the art and may be resorted if desired.

I claim:

1. A hatch frame assembly for a freight vehicle comprising a roof sheet, a hollow cone of substantially circular cross section integral with, projecting upwardly from said roof sheet and defining a hatch frame, said hollow cone being defined by an upwardly continuously curving side wall curving on an irregular curve and terminating in an outwardly curled lip extending continuously about the upper end thereof to define a weather lip for said hatch frame.

2. The invention as defined in claim 1 wherein said hatch frame is formed adjacent one side margin of said sheet, and a corrugation is formed adjacent the other side margin of said sheet and parallel therewith.

3. The invention as defined in claim 1 wherein said roof sheet is formed with two axially aligned and transversely spaced hatch frames integral therewith, and plurality of corrugations are formed in said roof sheet in parallel spaced relationship to each other and to said hatch frames.

4. The invention as defined in claim 1 wherein said hatch frame projects upwardly, outwardly and backwardly on progressively decreasing radii from the plane of said roof sheet.

5. A hatch frame assembly for a freight vehicle comprising a roof sheet and a hollow hatch frame of substantially circular cross section integral with and projecting upwardly from said roof sheet on a continuous irregular curve, and a continuous outwardly curled lip formed integral with the upper end of said frame to define a weather lip, said hatch frame and said lip being of lesser thickness than said roof sheet as a result of the integral formation of said hatch frame with said roof sheet.

6. The invention as defined in claim 5 wherein said roof sheet includes transversely extending corrugations formed therein.

References Cited

UNITED STATES PATENTS

| | | | |
|---|---|---|---|
| 2,065,043 | 12/1936 | Bonsall | 52—53 |
| 2,204,551 | 6/1940 | Place | 52—204 |
| 2,260,938 | 10/1941 | Gilpin | 52—19 |
| 2,585,134 | 2/1952 | Kennedy | 52—204 X |
| 2,839,016 | 6/1958 | Hasten | 52—19 X |
| 3,090,160 | 5/1963 | Shauer et al. | 52—19 |

PRICE C. FAW, JR., Primary Examiner

U.S. Cl. X.R.

52—53, 204